(12) United States Patent
Himmelmann

(10) Patent No.: US 11,408,299 B1
(45) Date of Patent: Aug. 9, 2022

(54) EROSION MITIGATING LABYRINTH SEAL MATING RING

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/176,606

(22) Filed: Feb. 16, 2021

(51) Int. Cl.
| *F01D 11/02* | (2006.01) |
| *F01D 5/04* | (2006.01) |
| *F04D 29/08* | (2006.01) |
| *F04D 29/10* | (2006.01) |
| *F04D 29/12* | (2006.01) |

(52) U.S. Cl.
CPC .............. *F01D 11/02* (2013.01); *F01D 5/043* (2013.01); *F04D 29/08* (2013.01); *F04D 29/10* (2013.01); *F04D 29/12* (2013.01); *F04D 29/128* (2013.01); *F05D 2240/20* (2013.01); *F05D 2240/50* (2013.01); *F05D 2240/60* (2013.01)

(58) Field of Classification Search
CPC .......... F01D 11/02; F01D 5/043; F04D 29/08; F04D 29/083; F04D 29/10; F04D 29/102; F04D 29/12; F04D 29/122; F04D 29/124; F04D 29/128; F04D 29/162; F16J 15/447; F16J 15/4472; F05D 2240/20; F05D 2240/50; F05D 2240/60
See application file for complete search history.

(56) References Cited

U.S. PATENT DOCUMENTS

| 2,938,661 | A | * | 5/1960 | Ricketts | .................. F16C 33/80 415/111 |
| 5,190,440 | A | * | 3/1993 | Maier | ................... F04D 29/162 277/412 |
| 5,297,928 | A | * | 3/1994 | Imakiire | ............... F04D 29/162 415/174.3 |
| 5,403,019 | A | * | 4/1995 | Marshall | ............... F04D 29/122 277/413 |
| 9,057,383 | B2 | * | 6/2015 | Vannini | .................. F04D 29/122 |
| 9,133,725 | B2 | * | 9/2015 | Wiebe | ..................... F01D 11/02 |
| 9,200,528 | B2 | | 12/2015 | Zheng et al. | |
| 9,638,052 | B2 | | 5/2017 | Shorney | |
| 10,208,762 | B2 | * | 2/2019 | Venkataraman | ........ F04D 17/12 |
| 2006/0237914 | A1 | | 10/2006 | Li et al. | |

(Continued)

FOREIGN PATENT DOCUMENTS

| EP | 2151583 A2 * | 2/2010 | ......... F04D 29/0516 |
| EP | 3034784 A1 | 6/2016 | |

*Primary Examiner* — Courtney D Heinle
*Assistant Examiner* — Ryan C Clark
(74) *Attorney, Agent, or Firm* — Cantor Colburn LLP

(57) ABSTRACT

A compressor assembly includes an impeller rotatable about a central axis and a seal assembly. The seal assembly includes a labyrinth seal defining a seal interface with a sealing element of the impeller and a seal support ring into which the labyrinth seal is installed. The seal support includes a deflector ramp fluidly downstream of the seal interface. The deflector ramp is configured to turn an airflow leaking through the seal interface radially inwardly toward the central axis. A plurality of tortuous pathways are formed in a downstream surface of the seal support ring and are configured to diffuse a tangential component of the airflow.

20 Claims, 4 Drawing Sheets

(56) References Cited

U.S. PATENT DOCUMENTS

| | | | |
|---|---|---|---|
| 2007/0063449 A1* | 3/2007 | Muller | F04D 29/284 |
| | | | 277/411 |
| 2007/0065277 A1* | 3/2007 | Muller | F16J 15/447 |
| | | | 415/170.1 |
| 2012/0183388 A1* | 7/2012 | Vannini | F16J 15/4472 |
| | | | 415/111 |
| 2018/0100514 A1* | 4/2018 | Venkataraman | F04D 29/00 |
| 2020/0247548 A1* | 8/2020 | Fagundes | B64D 13/00 |

* cited by examiner

EROSION MITIGATING LABYRINTH SEAL MATING RING

BACKGROUND

Exemplary embodiments pertain to the art of environmental control units for, for example, aircraft.

On some aircraft, the cabin and/or other areas are pressurized by an electrically-driven cabin air compressor (CAC). The CAC takes in air flow at atmospheric pressure from outside the aircraft and compresses the airflow to a comfortable pressure for the aircraft cabin. This compressed air flow is then directed into the cabin.

In some operating conditions, erosion damage occurs to a bearing support housing downstream of the compressor impeller. This erosion damage occurs when foreign object particles bypass a labyrinth seal between the impeller and the bearing support housing and subsequently impact the bearing support housing. Such erosion of the bearing support housing shortens the service life of the bearing support housing specifically and the cabin air compressor in general.

BRIEF DESCRIPTION

In one embodiment, a compressor assembly includes an impeller rotatable about a central axis and a seal assembly. The seal assembly includes a labyrinth seal defining a seal interface with a sealing element of the impeller and a seal support ring into which the labyrinth seal is installed. The seal support includes a deflector ramp fluidly downstream of the seal interface. The deflector ramp is configured to turn an airflow leaking through the seal interface radially inwardly toward the central axis. A plurality of tortuous pathways are formed in a downstream surface of the seal support ring and are configured to diffuse a tangential component of the airflow.

Additionally or alternatively, in this or other embodiments the plurality of tortuous pathways is circumferentially spaced.

Additionally or alternatively, in this or other embodiments a tortuous pathway of the plurality of tortuous pathways includes a pathway inlet and a pathway outlet. The pathway inlet is located radially inboard of the pathway outlet.

Additionally or alternatively, in this or other embodiments a tortuous pathway of the plurality of tortuous pathways is one of S-shaped, multiple S-shaped or Z-shaped.

Additionally or alternatively, in this or other embodiments the labyrinth seal is formed from a first, relatively soft material and the seal support ring is formed from a second, relatively hard material.

Additionally or alternatively, in this or other embodiments a shaft is operably connected to the impeller, and a bearing assembly includes a bearing supportive of the shaft and a bearing support housing into which the bearing assembly is installed. The seal support ring is located axially between the impeller and the bearing support housing.

Additionally or alternatively, in this or other embodiments the deflector ramp deflects the airflow from impacting on the bearing support housing.

Additionally or alternatively, in this or other embodiments the seal support ring is installed to the bearing support housing.

Additionally or alternatively, in this or other embodiments the sealing element of the impeller is located at a sealing flange of the impeller extending axially from the impeller.

In another embodiment, a cabin air compressor includes a compressor housing having an inlet and an outlet, and an impeller located in the housing. The impeller is rotatable about a central axis and is configured to compress an airflow directed through the inlet and direct the compressed airflow to the outlet. A seal assembly includes a labyrinth seal defining a seal interface with a sealing element of the impeller and a seal support ring into which the labyrinth seal is installed. The seal support includes a deflector ramp fluidly downstream of the seal interface. The deflector ramp is configured to turn an airflow leaking through the seal interface radially inwardly toward the central axis. A plurality of tortuous pathways are formed in a downstream surface of the seal support ring and configured to diffuse a tangential component of the airflow.

Additionally or alternatively, in this or other embodiments the plurality of tortuous pathways is circumferentially spaced.

Additionally or alternatively, in this or other embodiments a tortuous pathway of the plurality of tortuous pathways includes a pathway inlet and a pathway outlet. The pathway inlet is located radially inboard of the pathway outlet.

Additionally or alternatively, in this or other embodiments a tortuous pathway of the plurality of tortuous pathways is one of S-shaped, multiple S-shaped or Z-shaped.

Additionally or alternatively, in this or other embodiments the labyrinth seal is formed from a first, relatively soft material and the seal support ring is formed from a second, relatively hard material.

Additionally or alternatively, in this or other embodiments a shaft is operably connected to the impeller. A bearing assembly includes a bearing supportive of the shaft and a bearing support housing into which the bearing assembly is installed. The seal support ring is located axially between the impeller and the bearing support housing.

Additionally or alternatively, in this or other embodiments the deflector ramp deflects the airflow from impacting on the bearing support housing.

Additionally or alternatively, in this or other embodiments the seal support ring is installed to the bearing support housing.

Additionally or alternatively, in this or other embodiments an electrical motor is operably connected to the shaft to drive rotation of the impeller about the central axis.

Additionally or alternatively, in this or other embodiments the sealing element of the impeller is located at a sealing flange of the impeller extending axially from the impeller.

Additionally or alternatively, in this or other embodiments the compressed airflow is directed from the outlet to a cabin of an aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
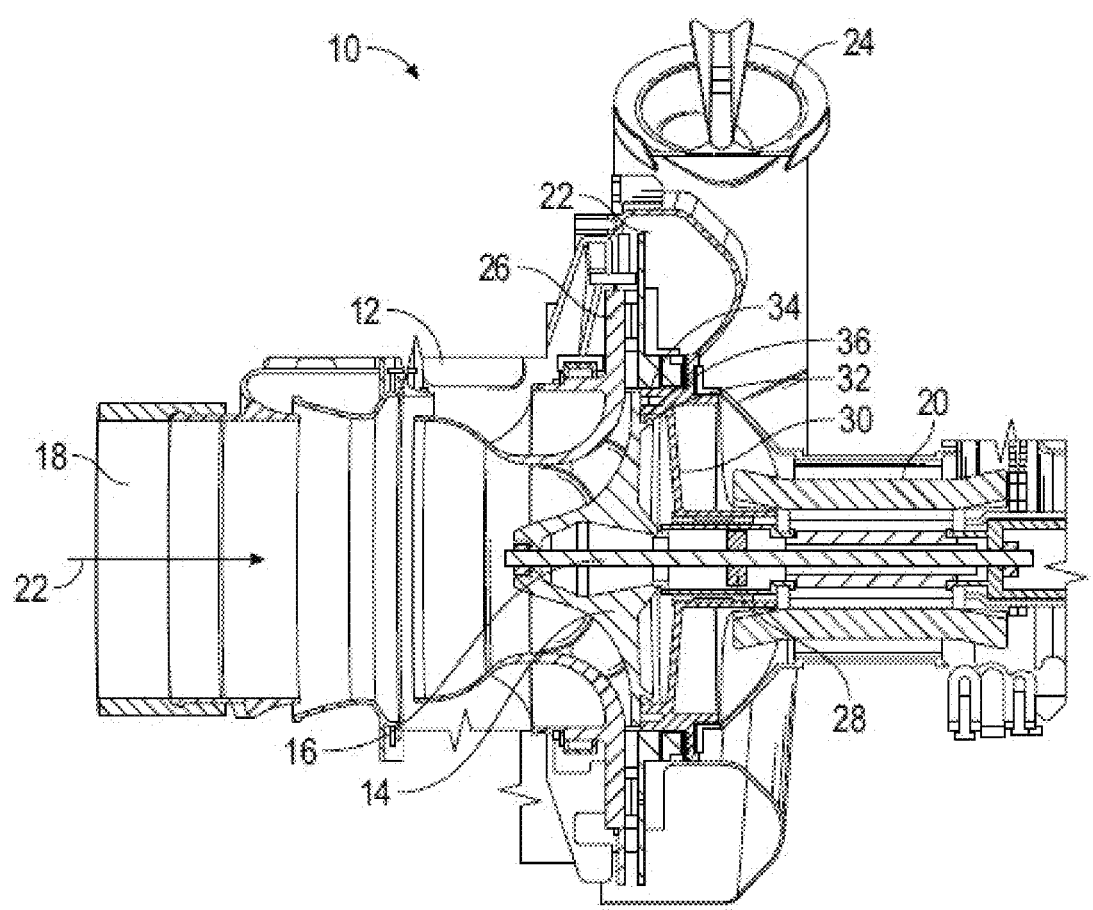
FIG. 1 is a schematic illustration of an embodiment of a cabin air compressor.

Referring now to FIG. 1, illustrated is a schematic illustration of an embodiment of a cabin air compressor 10. The cabin air compressor 10 includes a compressor housing 12 in which a compressor impeller 14 is located. The compressor impeller 14 is driven by a shaft 16. The shaft 16, in turn, is driven by a power source, which in some embodiments is an electric motor 20. Airflow 22 at ambient pressure enters the cabin air compressor 10 at an inlet 18 and is urged across the compressor impeller 14 and compressed. The compressed airflow 22 then is directed through an outlet 24 to a selected location, for example, aircraft cabin 26. The shaft 16 and compressor impeller 14 are supported by a bearing 28, which is installed in a bearing support housing 30 located in the compressor housing 12. A labyrinth seal 32 is located at an impeller outer perimeter 34 to prevent airflow from leaking past the impeller outer perimeter 34. The labyrinth seal 32 is installed in and supported by a labyrinth seal mating ring 36 installed to the bearing support housing 30. As will be discussed in greater detail below, this labyrinth seal mating ring 36 includes features to prevent erosion of the bearing support housing 30.

Figure 2:
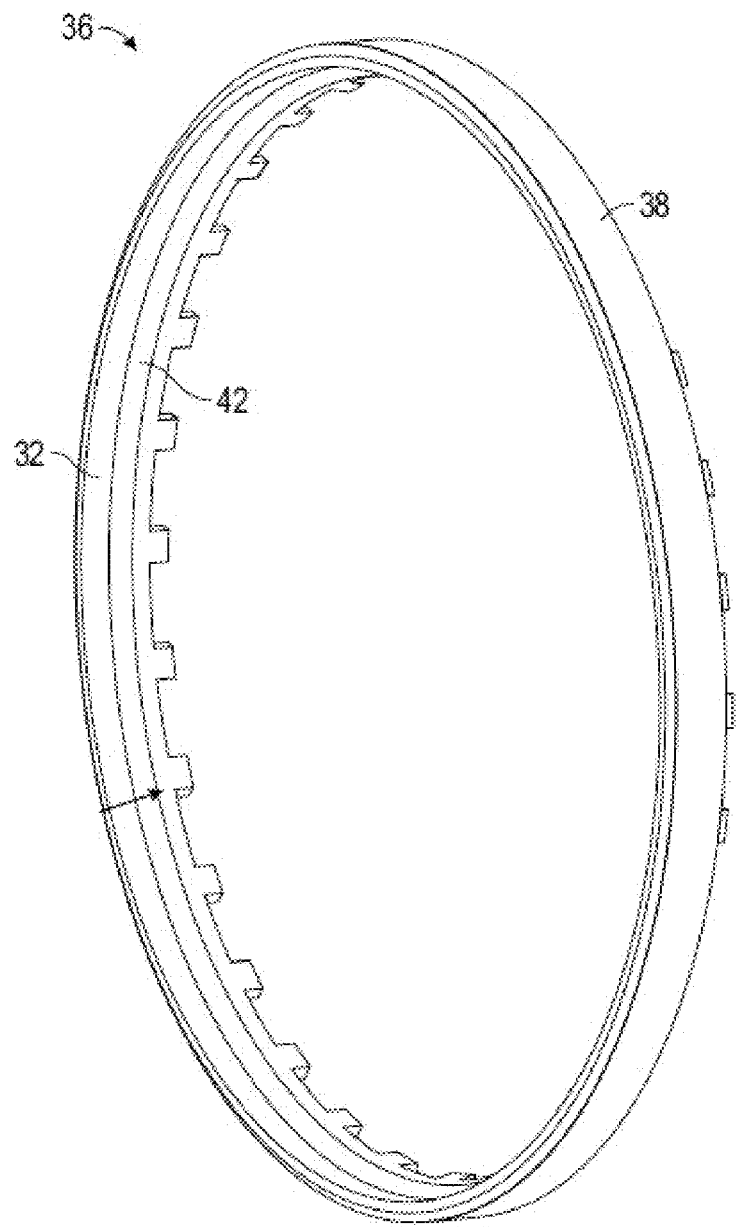
FIG. 2 is a perspective view of an embodiment of a labyrinth seal mating ring of a cabin air compressor.

Referring now to FIG. 2, the labyrinth seal mating ring 36 is shown in more detail. The labyrinth seal mating ring 36 is a ring structure, having a ring outer surface 38, which mates to the bearing support housing 30. While illustrated as a complete ring, in some embodiments the labyrinth seal mating ring 36 may be a circumferentially segmented structure. The labyrinth seal 32 is located at a ring inner surface 42, substantially opposite to the ring outer surface 38. In some embodiments, the labyrinth seal mating ring 36 is formed from a relatively hard material, while the labyrinth seal 32 is formed from a relatively soft material.

Figure 3:
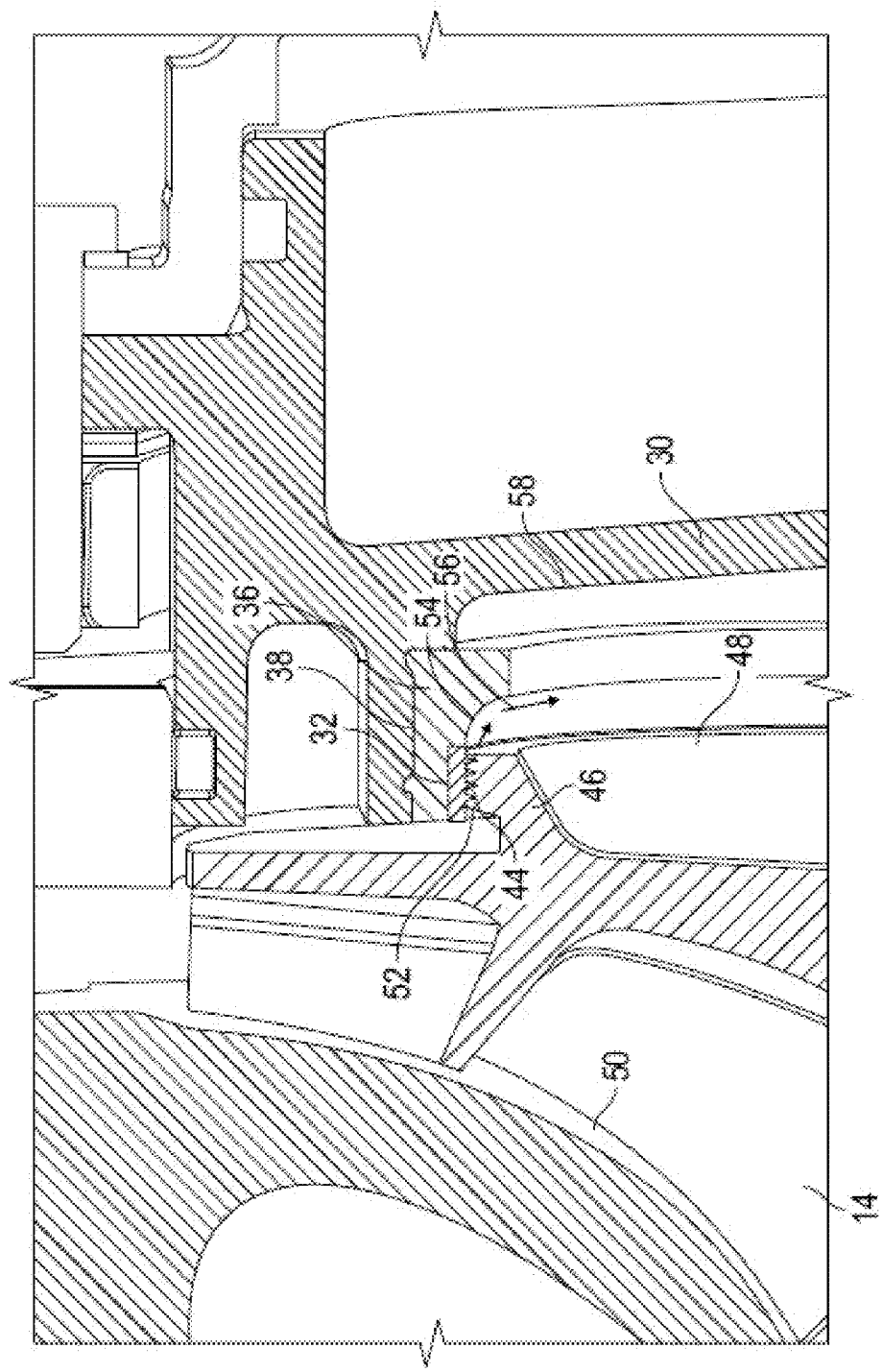
FIG. 3 is a partial cross-sectional view of an embodiment of a labyrinth seal ring installed into a cabin air compressor.

Referring now to FIG. 3, when installed, the labyrinth seal 32 is located at a corresponding impeller sealing surface 44 of the compressor impeller 14. In some embodiments, the impeller sealing surface 44 is located at a sealing flange 46 extending from a downstream side 48 of the compressor impeller 14 opposite to an upstream side 50 relative to the location of the inlet 18. The labyrinth seal 32 and the impeller sealing surface 44 define a seal interface 52. The labyrinth seal mating ring 36 includes a deflector ramp 54 extending radially inboard from the ring inner surface 42. The deflector ramp 54 also extends radially inboard of a radial location of the seal interface 52. In some embodiments, the deflector ramp 54 is curvilinear such as shown in FIG. 3, while in other embodiments, the deflector ramp 54 may be another shape, such as linear or some combination of curvilinear and linear.

In operation, air flow 22 that leaks past the seal interface 52 as leakage airflow 56 is diverted radially inwardly by the deflector ramp 54, to reduce impact of the leakage airflow 56 and any included particles or foreign objects on a support wall 58 of the bearing support housing 30. Such diversion of the leakage airflow 56 by the deflector ramp 54 reduces erosion of the bearing support housing 30.

Figure 4:
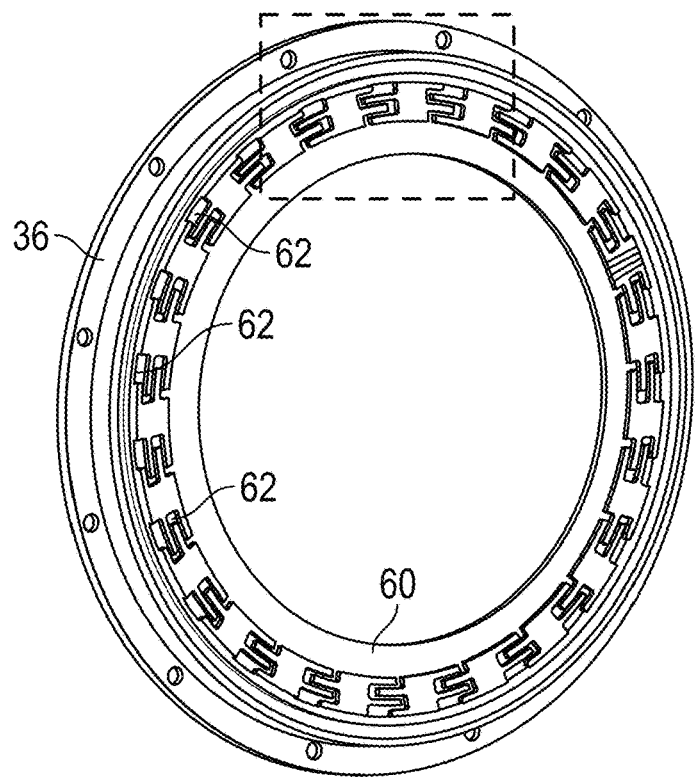
FIG. 4 is a perspective view of an embodiment of a downstream side of a labyrinth seal ring.
Figure 5:
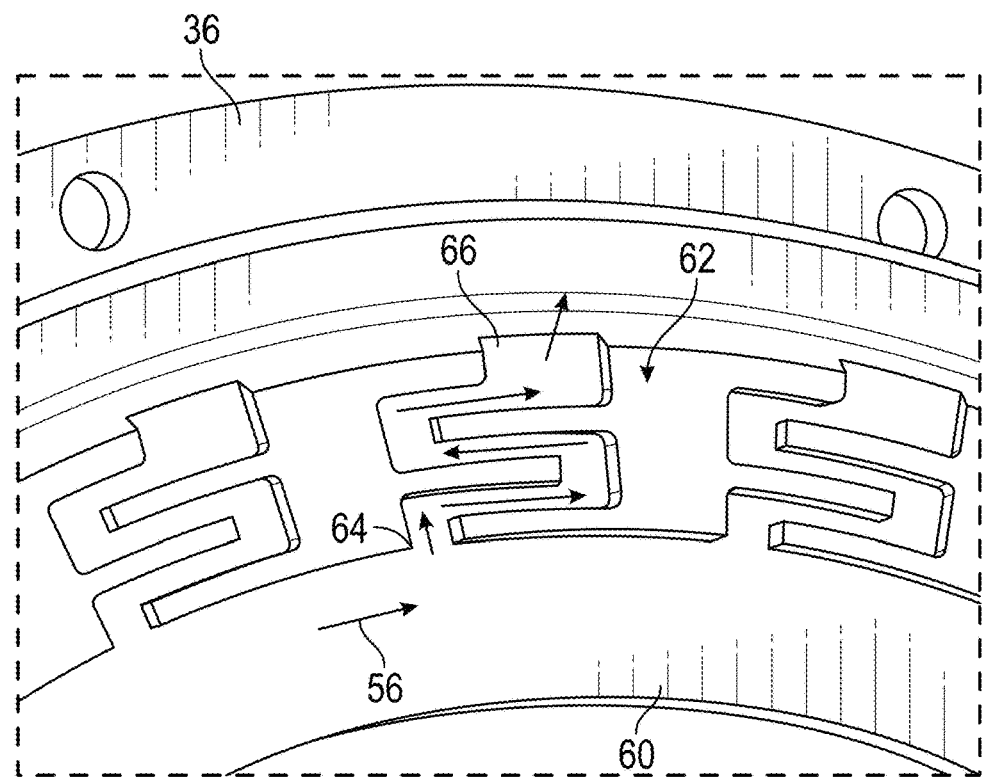
FIG. 5 is another perspective view of an embodiment of a downstream side of a labyrinth seal ring.

The leakage airflow 56 typically has a significant tangential or circumferential velocity component due to rotation of the compressor impeller 14. Referring now to FIG. 4 and FIG. 5, illustrated is a downstream side 60 of the labyrinth seal mating ring 36. The downstream side 60 includes a plurality of tortuous pathways 62 formed into the downstream side 60. The plurality of tortuous pathways 62 are circumferentially spaced along the downstream side 60, and in some embodiments are equally circumferentially spaced. The tortuous pathways 62 each have a pathway inlet 64 and a pathway outlet 66, and in some embodiments the pathway inlet 64 is located radially inboard of the pathway outlet 66. The tortuous pathway 62 extends between the pathway inlet 64 and the pathway outlet 66, with in some embodiments an S-shape, a multiple S-shape, a Z-shape, or the like.

In operation, the leakage airflow 56 at the downstream side 60 encounters the tortuous pathways 62, and at least a portion of the leakage airflow 56 is diverted into the tortuous pathways 62 via the pathway inlets 64. Along the tortuous pathway 62, the leakage airflow 56 is slowed and diffused such that the velocity of the leakage airflow 56 is greatly reduced as the leakage airflow 56 exits the tortuous pathways 62 at their respective pathway outlets 66.

The tortuous pathways 62 thereby reduce the tangential velocity component of the leakage airflow 56 to reduce the erosion of the bearing support housing 30.

The labyrinth seal mating ring 36 described herein reduces erosion of the bearing support housing 30 of the cabin air compressor 10, thus extending the service life of the bearing support housing 30 and the cabin air compressor 10 overall. Further, the labyrinth seal mating ring 36 is configured to be retrofittable into existing cabin air compressors 10, without the need to modify surrounding components.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor assembly, comprising:
   an impeller rotatable about a central axis; and
   a seal assembly including:
      a labyrinth seal defining a seal interface with a sealing element of the impeller;
      a seal support ring into which the labyrinth seal is installed, the seal support including a deflector ramp fluidly downstream of the seal interface, the deflector ramp configured to turn an airflow leaking through the seal interface radially inwardly toward the central axis; and a plurality of tortuous pathways formed in a downstream surface of the seal support ring and configured to diffuse a tangential component of the airflow.

2. The compressor assembly of claim 1, wherein the plurality of tortuous pathways is circumferentially spaced.

3. The compressor assembly of claim 1, wherein a tortuous pathway of the plurality of tortuous pathways includes a pathway inlet and a pathway outlet, the pathway inlet disposed radially inboard of the pathway outlet.

4. The compressor inlet of claim 1, wherein a tortuous pathway of the plurality of tortuous pathways is one of S-shaped, multiple S-shaped or Z-shaped.

5. The compressor assembly of claim 1, wherein the labyrinth seal is formed from a first, relatively soft material and the seal support ring is formed from a second, relatively hard material.

6. The compressor assembly of claim 1, further comprising:
a shaft operably connected to the impeller; and
a bearing assembly including:
a bearing supportive of the shaft; and
a bearing support housing into which the bearing assembly is installed, the seal support ring disposed axially between the impeller and the bearing support housing.

7. The compressor assembly of claim 6, wherein the deflector ramp deflects the airflow from impacting on the bearing support housing.

8. The compressor assembly of claim 6, wherein the seal support ring is installed to the bearing support housing.

9. The compressor assembly of claim 1, wherein the sealing element of the impeller is disposed at a sealing flange of the impeller extending axially from the impeller.

10. A cabin air compressor, comprising:
a compressor housing having an inlet and an outlet;
an impeller disposed in the housing, the impeller rotatable about a central axis and configured to compress an airflow directed through the inlet and direct the compressed airflow to the outlet; and
a seal assembly including:
a labyrinth seal defining a seal interface with a sealing element of the impeller;
a seal support ring into which the labyrinth seal is installed, the seal support including a deflector ramp fluidly downstream of the seal interface, the deflector ramp configured to turn an airflow leaking through the seal interface radially inwardly toward the central axis; and
a plurality of tortuous pathways formed in a downstream surface of the seal support ring and configured to diffuse a tangential component of the airflow.

11. The cabin air compressor of claim 10, wherein the plurality of tortuous pathways is circumferentially spaced.

12. The cabin air compressor of claim 10, wherein a tortuous pathway of the plurality of tortuous pathways includes a pathway inlet and a pathway outlet, the pathway inlet disposed radially inboard of the pathway outlet.

13. The cabin air compressor of claim 10, wherein a tortuous pathway of the plurality of tortuous pathways is one of S-shaped, multiple S-shaped or Z-shaped.

14. The cabin air compressor of claim 10, wherein the labyrinth seal is formed from a first, relatively soft material and the seal support ring is formed from a second, relatively hard material.

15. The cabin air compressor of claim 10, further comprising:
a shaft operably connected to the impeller; and
a bearing assembly including:
a bearing supportive of the shaft; and
a bearing support housing into which the bearing assembly is installed, the seal support ring disposed axially between the impeller and the bearing support housing.

16. The cabin air compressor of claim 15, wherein the deflector ramp deflects the airflow from impacting on the bearing support housing.

17. The cabin air compressor of claim 15, wherein the seal support ring is installed to the bearing support housing.

18. The cabin air compressor of claim 15, further comprising an electrical motor operably connected to the shaft to drive rotation of the impeller about the central axis.

19. The cabin air compressor of claim 10, wherein the sealing element of the impeller is disposed at a sealing flange of the impeller extending axially from the impeller.

20. The cabin air compressor of claim 10, wherein the compressed airflow is directed from the outlet to a cabin of an aircraft.

* * * * *